Figure 1:
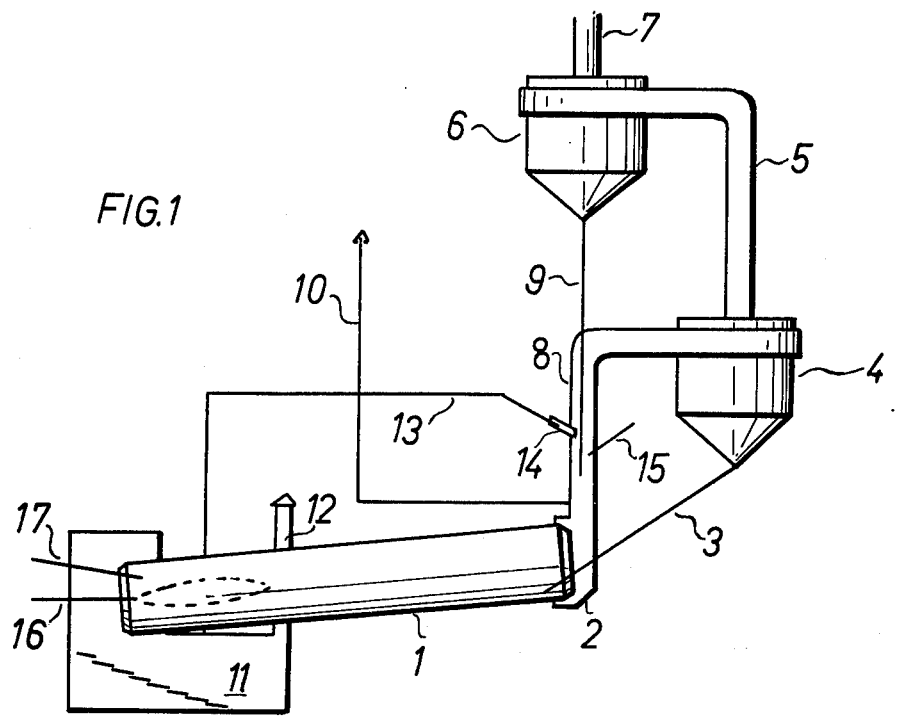

United States Patent [19]

Herchenbach

[11] 4,162,922

[45] Jul. 31, 1979

[54] METHOD AND APPARATUS FOR THE LOWERING OF THE ALKALI CONTENT OF CEMENT CALCINED TO COMPLETION

[75] Inventor: Horst Herchenbach, Troisdorf, Fed. Rep. of Germany

[73] Assignee: Klöckner-Humboldt-Deutz Aktiengesellschaft, Fed. Rep. of Germany

[21] Appl. No.: 690,273

[22] Filed: May 26, 1976

[30] Foreign Application Priority Data

May 27, 1975 [DE] Fed. Rep. of Germany ....... 2523367

[51] Int. Cl.² ................................................. C04B 7/02
[52] U.S. Cl. ................................................. 106/100
[58] Field of Search ........................ 106/100, 102, 103

[56] References Cited

U.S. PATENT DOCUMENTS

| | | | |
|---|---|---|---|
| 1,124,238 | 1/1915 | Brown | 106/100 |
| 1,209,135 | 12/1916 | Eckel | 106/100 |
| 1,224,454 | 5/1917 | Ellis | 106/100 |
| 1,250,291 | 12/1917 | Ellis | 106/100 |
| 1,411,518 | 4/1922 | Rhodes et al. | 106/100 |
| 1,964,685 | 6/1934 | Folger | 106/100 |
| 2,726,138 | 12/1955 | Cunningham | 106/100 |
| 4,001,031 | 1/1977 | McCord et al. | 106/100 |

*Primary Examiner*—L. Dewayne Rutledge
*Assistant Examiner*—John P. Sheehan
*Attorney, Agent, or Firm*—Hill, Van Santen, Steadman, Chiara & Simpson

[57] ABSTRACT

The alkali content of pulverized raw material used in the manufacture of cement is economically reduced as the material flows through a furnace system preheating, deacidizing and sintering the material by the introduction of an alkali-reducing, chlorine-containing additive to the material as it flows through one or more of the heating, deacidizing and sintering zones of the furnace.

3 Claims, 2 Drawing Figures

METHOD AND APPARATUS FOR THE LOWERING OF THE ALKALI CONTENT OF CEMENT CALCINED TO COMPLETION

The invention relates to a method for the lowering of the alkali content in completely calcined raw material used in the manufacture of cement that is thermally treated in a furnace system, in several steps, by means of addition of an alkali-reducing, chlorine-containing additive.

In cement chemistry and cement technology, it is known that alkali combinations in the cement influence its properties most unfavorably. Thus, alkali combinations in the cement which by means of moist $CO_2$ in the air are converted into alkali carbonate, appreciably shorten the solidification time and thus carry out the so-called setting of the cement. Furthermore, it is known that too high an alkali content in cement may lead to the efflorescence of alkali sulphates in the concrete. Also, in the case of the so-called reactive additives, through a high alkali content in the cement, a reaction of the alkalies with these additives may cause an alkali expansion of the cement and therewith may endanger the resistance to expansion and contraction of the concrete.

In order to diminish the alkali content of the cement clinker with reference to the latter processing of the cement and to attain a limitation of the alkalies for reasons of quality, attempts have been made to lower the alkali content in the cement clinker by adding chemicals to the raw material used in the manufacture of cement to be calcined, which will influence favorably the evaporation of the alkali. It has been found that additives, such as for example calcium sulphate ($CaSO_4$) or calcium fluoride ($CaF_2$) slightly influence the alkali content in the clinker. On the other hand, it is known to admix the raw material used in the manufacture of cement with up to 3% calcium chloride ($CaCl_2$). The alkali content in the cement calcined to completion is thereby lowered. This method for the lowering of the alkali content is, however, because of the high cost of calcium chloride, not economical and increases the cost of cement production.

According to a further method for the production of a cement clinker low in alkali, chlorine-containing materials effective to convert the alkalies contained in the charging material into alkali chloride include chlorinated organic waste products such as for example polychlorinated combinations, which are introduced into the rotary furnace or calciner. These chlorinated synthetic materials must, however, be introduced in carefully dosaged quantities into the rotary furnace or calciner, so that an active formation of alkali chloride and volatilization of the alkali chloride will occur. This requires, however, a high expenditure in the way of apparatus and technical regulation, which again works out unfavorably as to costs in cement production.

Other methods for the lowering of the alkali content in the clinker provided withdrawal of the alkali combinations evaporating in the sintering zone of the furnace system together with the exhaust gases of the rotary furnace or calciner after removal of dust directly from the heating process. The preheating of the raw material used in the manufacture of cement in the furnace system should then take place exclusively by means of hot cooler waste or exhaust air introduced in the preheating step. Hereby, however, the total heat balance of the furnace system is quite appreciably worsened. A withdrawal of the alkali combinations together with the furnace exhaust gas is, however, not possible, when the alkalies in the sintering zone do not evaporate or evaporate only incompletely, but diffuse directly into the end product.

It is the object of the invention to avoid the disadvantages of the previous methods for the production of a cement with low alkali content, and to lower the alkali content in the cement clinker with economically adaptable means and without upsetting the total heat balance of the furnace system to produce a qualitatively high grade cement with uniformly low alkali content in an economical manner.

This object is solved according to the invention in a furnace system consisting of a preheating step, a deacidizing step and a sintering step, by introducing the additive in the deacidizing step or the preheating step. By means of the intimately dispersive intermixture of the additive and the raw material particles, as a result of the uniformly high heat supply in the deacidizing step or in the preheating step, respectively, a rapid and complete thermal decomposition of the chlorine-containing additive is obtained. The chlorine being released may, therefore react over a longer period of time uniformly with the preheated particles of raw pulverized material, whereby both the alkalies deposited on the raw pulverized material as well as also the alkalies bound in the pulverized raw material, are converted to easily volatilized alkali chlorides before the sintering step so that the latter evaporate uniformly in the sintering step out of the calcining material because of the high temperatures prevailing there. Thus, a more uniform alkali content is attained in the cement clinker calcined to completion.

In development of the invention, it is provided that the additive together with a fuel are introduced into the deacidizing step. For this, any suitable fuel in gaseous, liquid or solid form may be used, to which the chlorine-containing additive is added in predetermined mixture ratios, so that the alkali-chloride formation is accurately adjusted and insured, and the thermal decomposition of the chloride-containing additive and the formation of the alkali chlorides commences immediately.

In further development of the invention, it is provided that a partial mixture of the additive is introduced into the deacidizing step and the residual quantity is introduced in the sintering step. Hereby both may a uniform alkali-chloride formation be attained in the deacidizing step, but also the alkali evaporation out of the cement clinker may be supported additionally effectively. This measure is offered particularly then when different types of additives with different properties with respect to their chlorine binding come into use. It is of particular advantage in the use of chloride-containing additives of different consistency, to introduce the liquid additives in the deacidizing step and to drive out the water content in this step, while the solid chlorine-containing additives are preferably introduced under full utilization of their heating value in the sintering step. Furthermore, through this measure for the formation of alkali chloride and therewith for the evaporation of these chlorides from the cement clinker in the sintering step, according to the invention, that does not need to be attributed to particularly sought-out coal rich in chlorine, as fuel, but another suitable fuel in gaseous, liquid or solid form may also be used in the sintering step.

In development of the invention, it is suitable to introduce additives into the hottest zone of the preheating step, so that there already a uniform formation of alkali chloride sets in. It is of advantage in this connection, to introduce a partial quantity of the additive in the hottest zone of the preheating step and the remaining quantity in the sintering step.

Furthermore, in development of the invention, it is particularly of advantage according to the method, a chlorine-containing synthetic material, such as polyvinylchloride be used for the increase of the alkali-volatilization. In this connection, in combination with the measure according to the invention, the additives may be introduced in the deacidizing zone or into the hottest zone of the preheating step. The production costs of cement with low alkali content may be lowered further, as these chlorine-containing synthetic materials may be withdrawn or derived from the synthetic-material-processing industry as inexpensive waste products and thus the expensive additives, for example, calcium chloride may be eliminated.

Since thermal decomposition of the synthetic materials occurs in the deacidizing zone or in the hottest zone of the preheating step, respectively, there takes place a still more uniform release of the bound chlorine and formation of alkali chlorides, which on accound of their low evaporation point have a high volatility. The heat released upon the thermal decomposition of the chlorine-containing synthetic materials may be utilized additionally in order to improve the thermal treatment of the pulverized raw material used in the preparation of cement in the individual treatment steps from a technical heating point of view. Since the invention utilizes waste products of chlorine-containing synthetic materials which previously were openly burned or carried to the waste dump, a great economical advantage is achieved.

The chlorine-containing synthetic material additive particularly favorable from a cost standpoint is available from the plastic industry, where polyvinylchloride is processed in particularly high degree, and accordingly occurs in large quantities also as a waste product. Polyvinylchloride also permits of being stored without danger in large quantities and beyond this, permits of being worked with comminuting machines to granules as fine as dust for entry into the cement industry. On account of the advantageous high content of chlorine in the polyvinylchloride, for example, with an addition of only 0.5% of the clinker production, about 0.3% potassium or sodium, respectively may be bound with the chlorine and evaporated.

In a particularly suitable development of the invention, the volatilized alkalies are at least partially withdrawn directly before their condensation from the furnace system. The concentration of the alkalies evaporated from the cement clinker in accordance with the method of this invention in the exhaust gases of the furnace system is so high, that the conducting off of a partial quantity of the furnace exhaust gases after the sintering step quite appreciably decreases the internal alkali circulation and therewith the alkali content in the cement clinker processed to completion, without the heat economy of the modern heat-saving furnace systems being impaired to a noteworthy extent.

Figure 2:
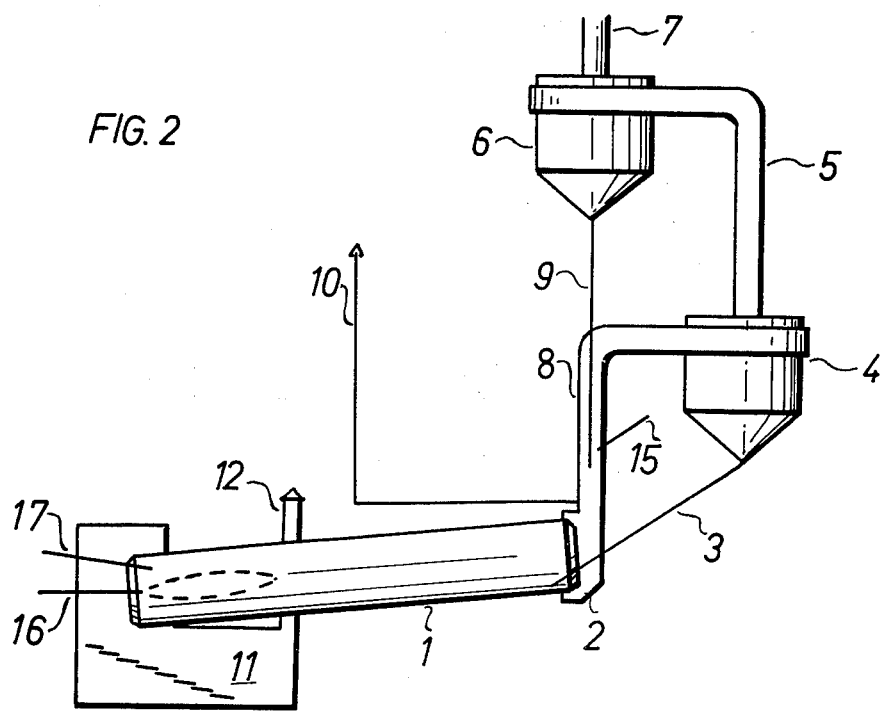

FIGS. 1 and 2 are diagrammatic illustrations of apparatus that may be used in the method of this invention.

The method according to the invention is explained in greater detail by reference to the drawings.

The embodiment according to FIG. 1, shows a furnace system including a furnace or calciner 1, an inlet chamber 2, in which discharges the material supply 3 from the lowermost cyclone 4 of a suspension-gas-heatexhanger. Above the cyclone 4 is located a gas offtake 5, which leads to the cyclone 6, from which the gas offtake 7 passes to the cyclones of the preheating step which are not shown. Between the rotary furnace or calciner 1 and the preheating step effected in the several cyclones, a vertically directed exhaust gas conduit 8 is provided into which discharges the material supply 9 of the cyclone 6. In the lower area of the exhaust gas conduit 8 there is attached a bypass conduit 10, which through dust-removing systems (not shown) is open to the atmosphere.

At the discharge end of the rotary furnace or calciner there is arranged a cooler 11 for the cement clinker to be cooled, the latter being open to the atmosphere through dust-removing installations (not shown). A secondary air conduit 13 from calciner devices 14 arranged in the gas conduit 8 above the feed conduit 9 is also connected to the discharge end of the calciner 1. The exhaust gas conduit 8 and the separate calcining devices form in this way a separate deacidizing step for the pulverized raw material used in the manufacture of cement, introduced through the feed conduit 9.

In the deacidizing step, there are provided in the exhaust gas conduit 8, preferably above the material feed conduit 9 and below the calcining devices 14, preferably tangentially directed feed devices 15 for an alkali-reducing additive, preferably a chlorine-containing synthetic material. At the material discharge end of the rotary furnace or calciner 1 there also are arranged in the area of the fuel feed 16, feed devices 17 for a chlorine-containing synthetic material.

In accordance with the method of the embodiment of FIG. 1, the following cycle occurs: For the lowering of the alkali content in the cement clinker in the deacidizing step, a partial quantity of the chlorine-containing synthetic material is introduced into the exhaust gas conduit 8 constructed with calcining devices 14 through the feed device 15, and the remaining quantity of the synthetic material is introduced in the sintering step through the feed devices 17 of the rotary furnace or calciner 1. In the deacidizing step, on account of thermal decomposition of the synthetic material, free chlorine molecules are formed which intimately contact the alkalies of the pulverized raw material charged through the material feed conduit 9, and thus are distributed uniformly and constantly into the pulverized raw material finely dispersed in the furnace exhaust gas to form the alkali chlorides. The alkali chloride containing pulverized raw material separated off in the cyclone 4 from the furnace exhaust gas arrives through the material feed 3 and the inlet chamber 2 at the sintering step of the rotary furnace or calciner 1. The chlorine containing synthetic material introduced in the sintering step of the rotary furnace or calciner 1 through the feed device 17 disintegrates thermally during formation of free chlorine molecules. The latter again react on their part with the alkalies still contained in the clinker to alkali chlorides, so that the alkalies of the pulverized raw material still not bound to the chlorine in the deacidizing step, then are bound to the chlorine in the sintering step, so that the alkali chlorides may be evaporated uniformly out of the cement clinker. The clinker calcined to completion in the rotary furnace or calciner 1 is cooled in the cooler 11 and discharged out of the furnace system.

A part of the alkali containing exhaust gases behind the rotary furnace or calciner 1 and before the deacidizing step are withdrawn before the condensation of the alkalies through the bypass 10 and are conveyed off through dust-removing systems (not shown) into the atmosphere. The quantities of exhaust gas highly enriched with alkali chlorides withdrawn from the furnace system, may in this connection be so adjusted, that without deteriorating the heat economy of the furnace system to a noteworthy extent, the low alkali content desired in each case in the clinker may be reliably controlled.

The utilization of the method according to the invention is not solely limited to the embodiment shown by way of example in FIG. 1, but may also be utilized with a furnace system shown in FIG. 2 where parts identical with those shown in FIG. 1 are marked with the same reference numerals. In FIG. 2, the preheating step is effected in the illustrated series of cyclones as in FIG. 1. In this connection, in the exhaust gas conduit 8 of the rotary furnace or calciner 1, which leads to the lowermost hottest cyclone, a partial quantity of the chlorine containing synthetic material is introduced at 15 which rapidly disintegrates thermally in this heating zone, while the residual quantity of the synthetic material is introduced at 17 in the sintering step of the rotary furnace or calciner, so that the chemical reactions already described above, between chlorine and the alkalies of the pulverized raw material used in the manufacture of cement introduced into the furnace system may be carried out uniformly. However, in the sintering step of the rotary furnace or calciner 1, the alkali chlorides are volatilized out of the cement clinker and the clinker discharged through the cooler 11 out of the furnace system without the secondary air conduit 13 and calciner devices 14 of FIG. 1 being provided.

I claim:

1. In the method of lowering the alkali metal content in the calcining to a finish of a pulverized raw material to be used in the manufacture of cement wherein the material is thermally treated in a furnace system in several steps including a preheating step, a separate deacidifying step, and a sintering step in a kiln, the improvements comprising introducing an alkali reducing chlorine containing additive material during said separate deacidifying step and introducing an additional residual quantity of said alkali reducing chlorine containing additive material in said sintering step.

2. The method of claim 1 wherein the alkali reducing chlorine containing additive material is polyvinylchloride.

3. In the method of lowering the alkali metal content in the calcining to a finish of a pulverized raw material to be used in the manufacture of cement wherein the material is thermally treated in a furnace system in several steps including a preheating step, a separate deacidifying step, and a sintering step in a kiln, the improvement comprising introducing an alkali reducing chlorine containing additive material during said separate deacidifying step.

* * * * *